Sept. 24, 1929.  W. C. SCHWIER ET AL  1,729,364
AUTOMOBILE VACUUM CLEANER SWITCH
Filed March 14, 1927
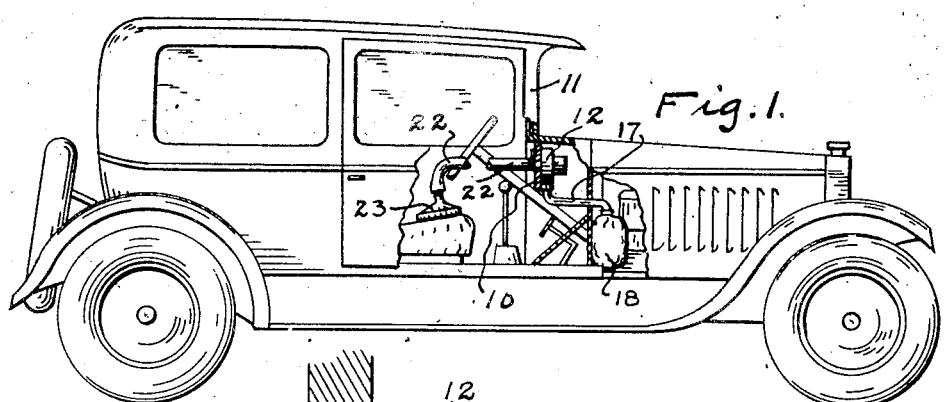
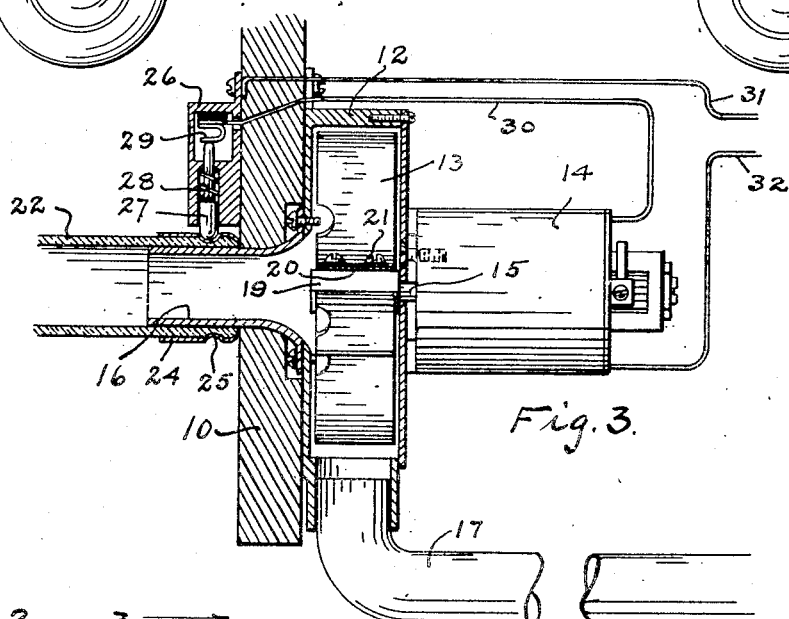
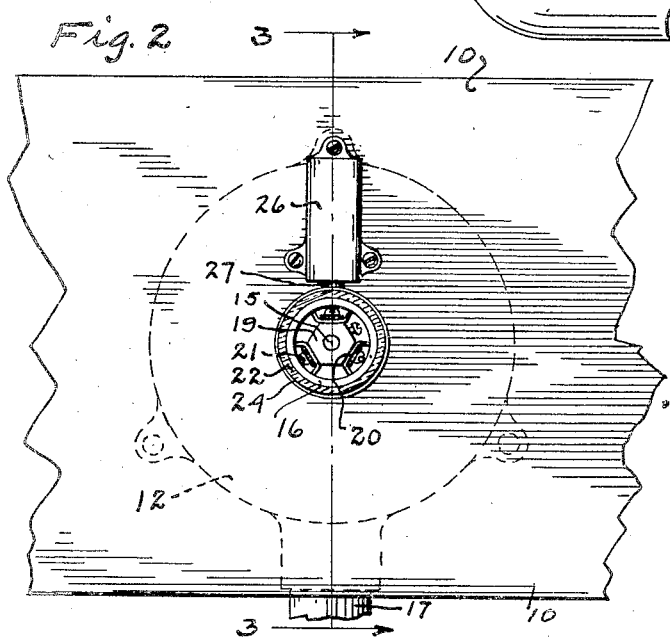
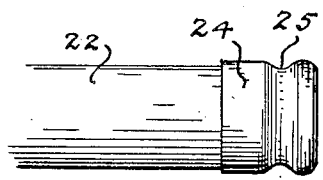
INVENTORS,
Wilbur C. Schwier, and
Norman V. Schaaf,
By Minturn & Minturn,
Attorneys.

Patented Sept. 24, 1929

1,729,364

UNITED STATES PATENT OFFICE

WILBUR C. SCHWIER AND NORMAN V. SCHAAF, OF INDIANAPOLIS, INDIANA

AUTOMOBILE VACUUM-CLEANER SWITCH

Application filed March 14, 1927. Serial No. 175,214.

This invention relates to a vacuum cleaner operated in conjunction with an automobile for the purpose of providing an easily available means for cleaning the automobile, particularly the interior upholstery and lining.

The vacuum producing mechanism is mounted in a convenient location in the automobile and is so constructed that it may not be set in operation unless there is the usual vacuum tube attached.

The invention is here described in one particular embodiment in reference to the accompanying drawing, in which—

Fig. 1, is a side elevation of an automobile with a fragment of its side removed;

Fig. 2, a front elevation of a section of the instrument board or panel of the automobile to which the invention is applied;

Fig. 3, a vertical section on the line 3—3 in Fig. 2, and

Fig. 4, a side elevation of the end of the vacuum hose.

Like characters of reference indicate like parts throughout the several views.

On the back side of the usual instrument panel 10 of the automobile 11 is attached a vacuum producing or air exhausting device comprising a hollow cylindrical body 12 in which is mounted a revolvable impeller or fan 13 turned from without by the small electric motor 14 through the shaft 15.

The intake passage to the fan 13 is through the nipple 16 to the center of the fan, and the discharge opening is positioned at the bottom of the body 12 to communicate with the conductor pipe 17 which in Fig. 1 shows as discharging into a bag 18, which retains the dust and dirt coming therein with the flow of air but which permits the air to escape therethrough in the manner well known to those versed in the art of the usual portable household vacuum cleaner. However, in some cases, if desired, the bag 18 may be dispensed with and the pipe 17 is then carried down to discharge under the automobile toward the ground.

The motor 14 is designed to be operated from the storage battery now found in all automobiles, and the fan 13 is particularly adapted to give the highest degree of vacuum with the lowest power input. The fan 13 is formed from a central hexagonal hub 19 through which the shaft 15 passes, and the blades or vanes of the fan, here shown as six in number are formed in three pairs with a short tie-piece 20 integrally interconnecting the inner ends of the blades in each pair. The ties 20 are secured to every other flat surface of the hub by means of the screws 21.

The nipple 16 extends through and slightly beyond the panel 10 to receive the end of the vacuum hose 22 which leads from the cleaning tool 23. The end of the hose 22 is fitted with an external ferrule 24 having an annular groove 25 therearound.

Immediately above the nipple 16 is a small electric switch 26 having a depending plunger 27 normally extended toward the nipple 16 by a spring 28. When the hose 22 is slipped over the nipple 16, the end of the ferrule 24 strikes the panel 10 and stops the hose with the result that the plunger 27 is lifted away from the nipple 16, and the groove 25 is positioned to let the end of the plunger 27 rest therein so that the hose 22 is retained on the nipple 16 against accidental displacement. The groove 25 may be dispensed with if desired though it is found to be advantageous.

When the plunger 27 is raised as above described, the upper end of the plunger touches a spring contact 29 thereby closing an electrical circuit through the switch body, the motor 14, the wire 30, and the wires 31 and 32 which lead to the storage battery (not shown) of the automobile.

Pulling the hose 22 off the nipple 16 allows the plunger 27 to spring down and out of contact with the contact 29 thereby interrupting the flow of current to the motor. Hence, whenever the hose 22 is attached the motor 14 operates, and when the hose is removed the motor stops, which action permits the operation of the motor only when the automobile is to be cleaned and insures against accidentally setting the motor in operation unaware which would exhaust the storage battery in most instances, before it would be noticed that the motor was running. At all times other than in actually cleaning the automobile, the hose 22 is always disconnected and kept out of sight.

The invention can of course assume several forms, as for one example, the nipple 16 may be kept back of the face of the panel 10 and the switch 26 incorporated within the panel or behind it to be concealed from sight.

We claim:

1. In a vacuum cleaner operated by an electric motor and having an intake fitting, a hose adapted to slide over said fitting, a switch controlling said motor, and a plunger operating said switch normally projecting toward said fitting, a ferrule on the end of the hose having an annular depression therearound, whereby the sliding of said hose over said fitting causes said hose to press said plunger away from said fitting and close said switch and to have the end of said plunger resting in said depression to yieldingly retain the hose on said fitting.

2. In a motor driven vacuum cleaner, an intake nozzle, a hose adapted to slide over the nozzle, an electric switch normally open, a switch actuating plunger adapted to travel normally of said nozzle, said plunger being yieldingly pressed back away from said nozzle to close said switch upon positioning said hose on the nozzle and means by which the plunger retains the hose on the nozzle.

3. In a motor driven vacuum cleaner, an intake nozzle, a hose adapted to slide over the nozzle, an electric switch normally open, a switch actuating plunger adapted to travel normally of said nozzle, said plunger being yieldingly pressed back away from said nozzle to close said switch upon positioning said hose on the nozzle and a fitting on said hose associating with said plunger whereby said hose is yieldingly retained on the nozzle.

In testimony whereof we affix our signatures.

WILBUR C. SCHWIER.
NORMAN V. SCHAAF.